US012706896B2

(12) United States Patent
Friedman

(10) Patent No.: US 12,706,896 B2
(45) Date of Patent: Aug. 11, 2026

(54) DETECTION OF LOGGED-ON USERS BASED ON BROWSER STORAGE DATA

(71) Applicant: MICROSOFT TECHNOLOGY LICENSING, LLC, Redmond, WA (US)

(72) Inventor: Tamir Friedman, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 63 days.

(21) Appl. No.: 18/679,343

(22) Filed: May 30, 2024

(65) Prior Publication Data

US 2025/0373589 A1 Dec. 4, 2025

(51) Int. Cl.
*H04L 9/40* (2022.01)
*H04L 67/02* (2022.01)

(52) U.S. Cl.
CPC .............. *H04L 63/08* (2013.01); *H04L 67/02* (2013.01)

(58) Field of Classification Search
None
See application file for complete search history.

(56) References Cited

U.S. PATENT DOCUMENTS 6,292,802 B1 * 9/2001 Kessenich ............ G06F 16/951 707/999.102
7,026,658 B2 * 4/2006 Park ....................... H10D 86/00 257/E27.111
8,578,036 B1 * 11/2013 Holfelder ............ G06F 21/6263 709/224
10,084,881 B2 * 9/2018 Matsumoto ........... H04L 67/306
10,338,977 B2 * 7/2019 Yoon ..................... G06F 16/338
10,831,836 B2 * 11/2020 Zhang ..................... H04L 63/08
11,121,863 B1 * 9/2021 O'Neill ................. H04L 9/3247
11,233,802 B1 * 1/2022 Rudeanu ............. H04L 63/0435
11,747,996 B2 * 9/2023 Senyuk ..................... G06F 1/10 711/164
12,339,860 B2 * 6/2025 Lee ..................... G06F 16/2282
2011/0078321 A1 * 3/2011 Muret ................... H04L 67/142 709/228
2013/0103658 A1 * 4/2013 Travis ................ G06F 16/2477 707/700

(Continued)

*Primary Examiner* — Lashonda Jacobs-Burton
(74) *Attorney, Agent, or Firm* — David Foster; Newport IP, LLC

(57) ABSTRACT

The disclosed techniques detect when a browser user remains logged-on to a website. Knowing that a browser user remains logged-on improves posture management in the face of cyberattacks. Visibility of the attack surface improves, and insight on how to reduce attack exposure is obtained. Furthermore, knowledge of when a web browser user was logged-on to a particular website may assist in post-hoc investigation of security incidents. In some configurations, local browser storage is scanned for key-value pairs that indicate a user remains logged-on. A key that matches a particular pattern and which includes a user identifier may indicate that a user remains logged-on. Additionally, or alternatively, specific keys may be associated with values that contain the identifier of a logged-on user. A security operation may be performed to warn a responsible party or to mitigate the vulnerability.

20 Claims, 5 Drawing Sheets

(56) References Cited

U.S. PATENT DOCUMENTS

| | | | | |
|---|---|---|---|---|
| 2013/0246563 | A1* | 9/2013 | Cardozo | G06F 16/955<br>709/217 |
| 2014/0019518 | A1* | 1/2014 | Nepper | G06F 16/9574<br>709/203 |
| 2014/0281535 | A1* | 9/2014 | Kane | G06F 21/6209<br>713/168 |
| 2017/0093828 | A1* | 3/2017 | Lupien | H04L 63/08 |

* cited by examiner

DETECTION OF LOGGED-ON USERS BASED ON BROWSER STORAGE DATA

BACKGROUND

Cyber-attacks impose significant financial, reputational, and operational costs. Cloud computing infrastructure is a frequent target of cyber-attacks due to the ubiquity of cloud-hosted services. One vulnerability leveraged by attackers is a web browser that remains logged-on to a website. Attackers that gain access to a logged-on browser may obtain sensitive information, initiate financial transactions, or destroy critical data. If the website provides access to computing resources, such as additional computing devices or cloud services, the attacker may use these resources to broaden the scope of the attack.

It is with respect to these and other considerations that the disclosure made herein is presented.

SUMMARY

The disclosed techniques detect when a browser user remains logged-on to a website. Knowing that a browser user remains logged-on improves posture management in the face of cyberattacks. Visibility of the attack surface improves, and insight on how to reduce attack exposure is obtained. Furthermore, knowledge of when a web browser user was logged-on to a particular website may assist in post-hoc investigation of security incidents. In some configurations, local browser storage is scanned for key-value pairs that indicate a user remains logged-on. A key that matches a particular pattern and which includes a user identifier may indicate that a user remains logged-on. Additionally, or alternatively, specific keys may be associated with values that contain the identifier of a logged-on user. A security operation may be performed to warn a responsible party or to mitigate the vulnerability.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 2 illustrates scanning a key-value store of a web browser for an indication that a browser user remains logged-on.

DETAILED DESCRIPTION

Detection of a logged-on browser user is a complex challenge. One technique uses a cookie saved by a website to check if a user remains logged-on. Data stored inside a cookie is often encoded, compressed, or otherwise difficult to access directly. Instead, the cookie is provided as part of a request to the website. The response received from the website may then be analyzed to determine whether the user remains logged-on. However, this technique has a number of disadvantages. Cookies are considered highly sensitive, and so any attempt to perform this technique at scale by collecting cookies from multiple devices may put user data at risk. Another disadvantage is that sending requests to websites at scale is an engineering challenge and may itself appear suspicious to intrusion detection software.

Figure 1:
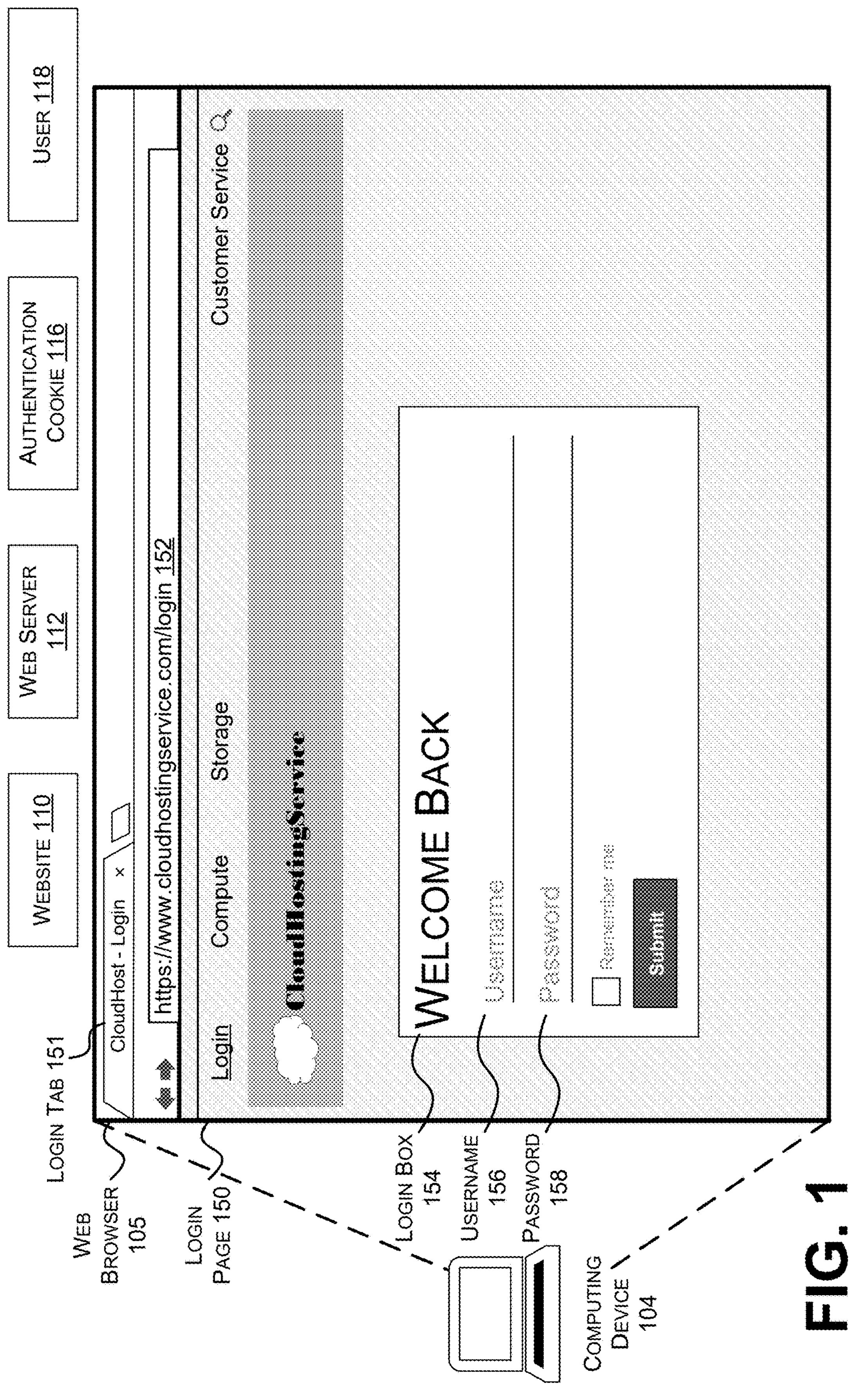
FIG. 1 illustrates a web browser of a computing device 104 displaying a login page of a cloud infrastructure website.

FIG. 1 illustrates web browser 105 of computing device 104 displaying login page 150 of cloud infrastructure website 110. Specifically, login tab 151 displays login page 150 that has Uniform Resource Locator (URL) 152.

Login page 150 includes login box 154 where username 156 and password 158 may be entered. Web server 112 receives the credentials, authenticates user 118, and returns authentication cookie 116 to browser 105. Authentication cookie 116 includes a cryptographically secured indication that user 118 may continue to access website 110 for a defined period of time without re-authenticating.

Figure 2:
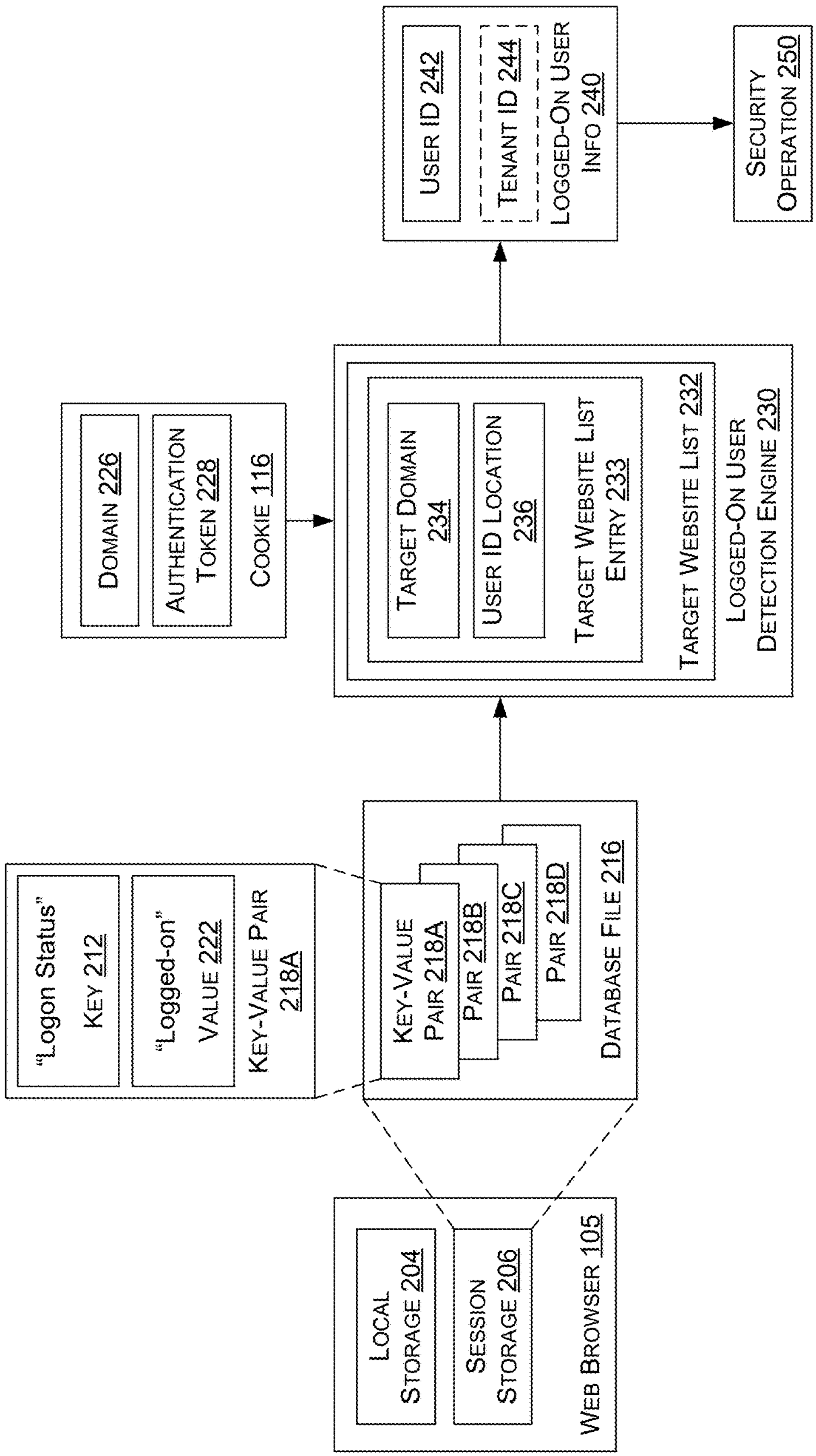

FIG. 2 illustrates scanning a key-value store of a web browser for an indication that a browser user remains logged-on. A key-value store is a type of database that stores key-value pairs. A key-value pair represents a unique key in association with a specific value. Example implementations of key-value stores include hash tables, maps, and other data structures that store key-value pairs. For example, a hash table uses a key to identify an entry in the table in which to store or retrieve the associated value. This setup allows for quick data retrieval by using the key to find its corresponding value. Web browser 105 includes two examples of key-value stores for storing data on computing device 104: local storage 204 and session storage 206.

Local storage 204 and session storage 206 differ primarily in how long data is retained before browser 105 clears it. Local storage 204 allows data to persist in the browser even after it is closed and reopened. This makes local storage 204 suitable for storing data that needs to be accessed across multiple sessions, such as user preferences or theme settings.

Session storage 206 is designed to store data for the duration of a browser session. Data stored in session storage 206 is often cleared when the tab 150 it is associated with is closed. However, web browsers do not always strictly adhere to this rule, often allowing session data for tab 150 to remain after tab 150 has been closed. Some browsers may also allow cookies associated with tab 150 to remain active after tab 150 has been closed.

Local storage 204 and session storage 206 may store key-value pairs 218 in a backing database file 216. Backing refers to providing underlying storage for features such as local storage 204 and session storage 206. In this example, database file 216 provides storage for local storage 204, session storage 206, and any other technology that website 110 or browser 105 may use to store a cookie.

Database file 216 is stored on a persistent storage medium accessible by computing device 104. Database file 216 differs from a cookie or a collection of cookies in part because data stored in a cookie is provided with web requests to the web server, while data stored in database file 216 remains local to computing device 104. Database file 216 also differs from a cookie or a collection of cookies in that database file 216 may store key-value pairs 218 for multiple domains in the same file, while cookies typically store data from different domains in different files. Database file 216 also differs from cookies in the format used to store the data. For example, one common implementation, leveldb, uses a log-structured merge-tree algorithm to store keys and values. However, other database algorithms, such as relational databases, are similarly contemplated.

Some websites store an indication that user 118 has successfully logged-on in key 212 and/or value 222 of key-value pair 218A. These websites often remove this indication when user 118 logs off. This allows logged-on user detection engine 230 to determine whether user 118 is logged-on by scanning for key-value pairs 218 that meet one or more criteria. In some configurations, logged-on user detection engine 230 may detect that multiple users are logged-on to one or more websites in a single scan of database file 216.

Logged-on user detection engine 230 may scan database file 216 for logged-on users in response to a number of events. For example, logged-on user detection engine 230 may initiate a scan for logged-on users periodically, e.g., nightly, in response to receiving an indication of a security threat, in response to detecting suspicious activity, in response to an indication that computing device 104 has been idle for a defined period of time, etc.

In some configurations, logged-on user detection engine 230 opens database file 216 and scans it to identify users that remain logged-on to one or more websites listed in target website list 232. Logged-on user detection engine 230 may scan database file 216 by enumerating key-value pairs 218 and analyzing the keys and/or values found according to user identifier (ID) locations 236. User ID locations 236 indicate to logged-on user detection engine 230 how to tell if a key-value pair of database file 216 indicates that a user remains logged-on to the corresponding target domain 234.

Target website list 232 contains one or more target website list entries 233. A target website list entry 233 includes target domain 234, a domain name of a target website, and user ID location 236, a description of how to determine when a key-value pair 218 indicates that user 110 remains logged-on to the corresponding target domain 234.

User ID location 236 may include a pattern of text that, when found in key 212, indicates that user 118 is logged-on to a website from target domain 234. Some of these patterns of text may also extract user identifier (ID) 242 from key 212. For example, user ID location 236 may include a regular expression that identifies when user 118 remains logged-on and which extracts user ID 242 from key 212. User ID location 236 may also specify comparison by exact string match or fuzzy string match between key 212 of key-value pair 218 and a predefined string pattern, among other string comparison techniques. User ID 242 may be any unique identifier, such as a globally unique identifier (GUID), string of random digits, username, or the like.

Other user ID locations 236 determine whether user 118 remains logged-on based on value 222. In order to obtain value 222, user ID location 236 may include a pattern that identifies keys 212 for which the corresponding value 222 identifies logged-on users. Keys 212 in this context may be predefined string patterns that are particular to specific domains. For example, AMAZON AWS may use a predefined string as key 212, a predefined string as a prefix or suffix of key 212, etc.

Once a key-value pair 218 that stores an indication of a logged-on user 118 in value 222 is found, information stored in user ID location 236 may be used to extract user ID 242 from the corresponding value 222. For example, value 222 may store data in JSON, XML, or another data exchange format. Logged-on user detection engine 230 may deserialize value 222 into an in-memory object and obtain user ID 242 from a field described by user ID location 236.

User ID location 236 may also indicate which storage API to check for a particular domain, e.g. local storage 204, session storage 206, or the like. User ID location 236 may also indicate which files on disk to scan. User ID location 236 may also indicate what alerts to raise and/or what security operations to implement in response to detecting a logged-on user. The disclosed techniques may also be used to extract other information from database file 216, such as a tenant identifier 244, a history of recently visited websites or recently submitted search queries, or any other information that is stored in particular key-value pairs 218 of database file 216.

In some scenarios, target website 110 refers to an authentication service, such as MICROSOFT AZURE ENTRA. In these scenarios, username 156 and password 158 may be used to log-on to any number of websites that leverage the authentication service. The process for determining if user 118 remains logged-on to an authentication service may be the same as for stand-alone websites.

Authentication cookie 116 includes credentials 228 returned when logging-on to target website 110. Authentication cookie 116 is what provides a hacker with the ability to use target website 110 on behalf of user 118. As such, if authentication cookie 116 does not exist for target domain 234, then there is no possibility for the attacker to leverage a browser user that remains logged-on to access target domain 234. Accordingly, logged-on user detection engine 230 may determine if an authentication cookie 116 exists for target domain 234 before scanning database file 216 for that particular domain. If an authentication cookie 116 for target domain 234 exists then logged-on user detection engine 230 responds by scanning database file 216 to determine if user 118 remains logged-on to target domain 234. If an authentication cookie 116 for target domain 234 does not exist then user 118 is not logged-on and a scan to determine if user 118 remains logged-on to target 234 is unnecessary.

In some configurations, logged-on user detection engine 230 is a component of a security analysis software, such as a client-side anti-virus software, or security component that is built into an operating system. This security component may perform related functions, such as determining whether user 118 is idle, identifying other suspicious activity that may constitute a security threat, receiving security threat indications, etc.

Logged-on user detection engine 230 may perform security operation 250 in response to determining that user 118 remains logged-on. Security operation 250 may warn user 118 or a system administrator. For example, security operation 250 may be a security alert that describes an attack path that an attacker may user to leverage the logged-on browser user 118. Security operation 250 may also aggregate indications of logged-on users from other devices, providing insight into vulnerabilities across an organization.

Security operation 250 may also mitigate the vulnerability. In some configurations, security operation 250 may log user 118 out from website 110, close browser 105 or tab 150, delete cookie 116, or the like. Security operation 250 may log user 118 out by generating a synthetic logout request and transmitting it to website 110. Security operation 250 may also indicate that user 118 remains logged in to website 110. For example, security operation 250 inform a system administrator of the vulnerable browser.

Figure 3:
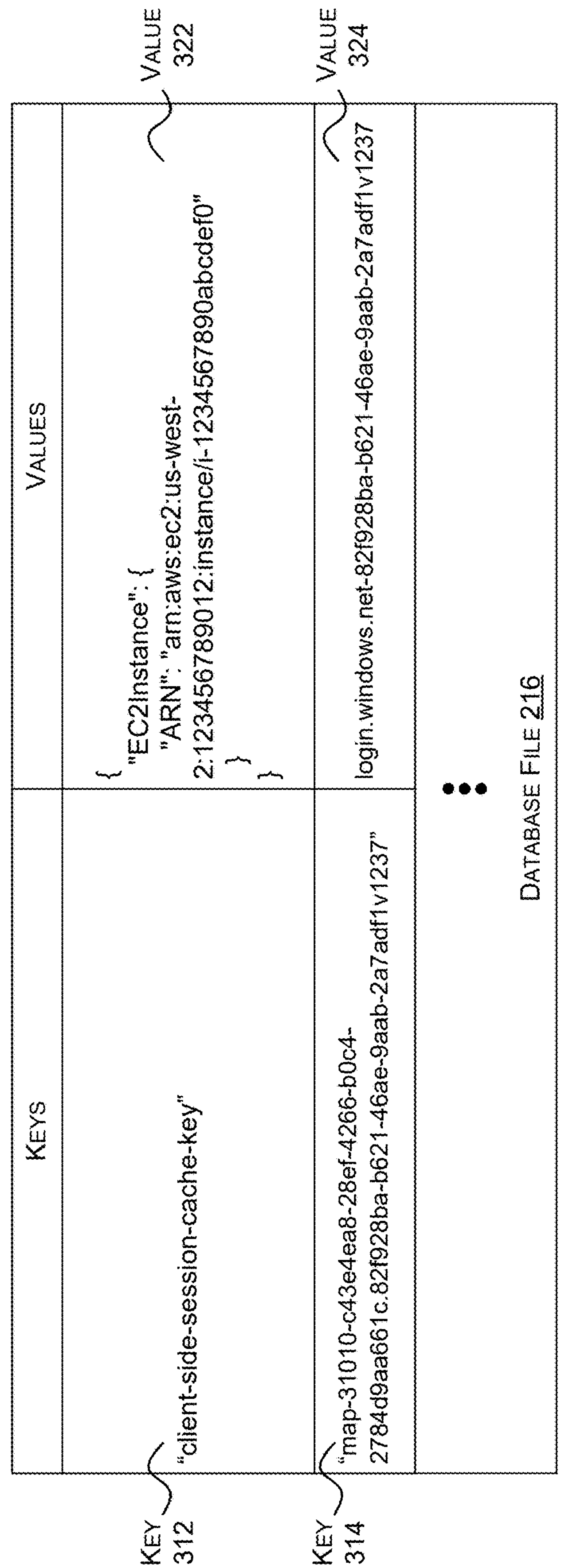
FIG. 3 illustrates example entries in a database file.

FIG. 3 illustrates example entries in database file 216. Key 312 and value 322 form a key-value pair that stores user ID 242 in value 322. Key 312 is an example of a predefined key that can be searched for directly. Specifically, user ID location 236 may indicate that keys named "client-side-session-cache-key" identify key-value pairs that include user ID 242. User ID location 236 may also indicate that value 322 is encoded with the JSON format, and that User ID 242 can be extracted by de-serializing value 322 into an in-memory object and accessing the "EC2Instance.ARN" member of the resulting object. The JSON format and the specific member names are examples—other ways of encoding data in value 322 and other locations of user ID 242 are similarly contemplated. Furthermore, value 322 may optionally include other types of data such as tenant ID 244, previous searches, previous pages visited, and other data saved by website 110 on computing device 104.

Key 314 and value 324 form a key-value pair in which user ID 242 is found in key 314. In this case, user ID 242 is a Globally Unique Identifier (GUID) "31010-c43e4ea8-28ef-4266-b0c4-2784d9aa661". This example also encodes tenant ID 244 in another GUID: "82f928ba-b621-46ae-9aab-2a7adflv1237." A user ID location 236 entry in target website list 232 may include a pattern such as "map-<USERIDGUID>.<TENANTGUID" to identify key 314 and to extract the user and tenant IDs. Keys that match this pattern may be used to identify any user from any tenant that remains logged-on to the corresponding website.

Figure 4:
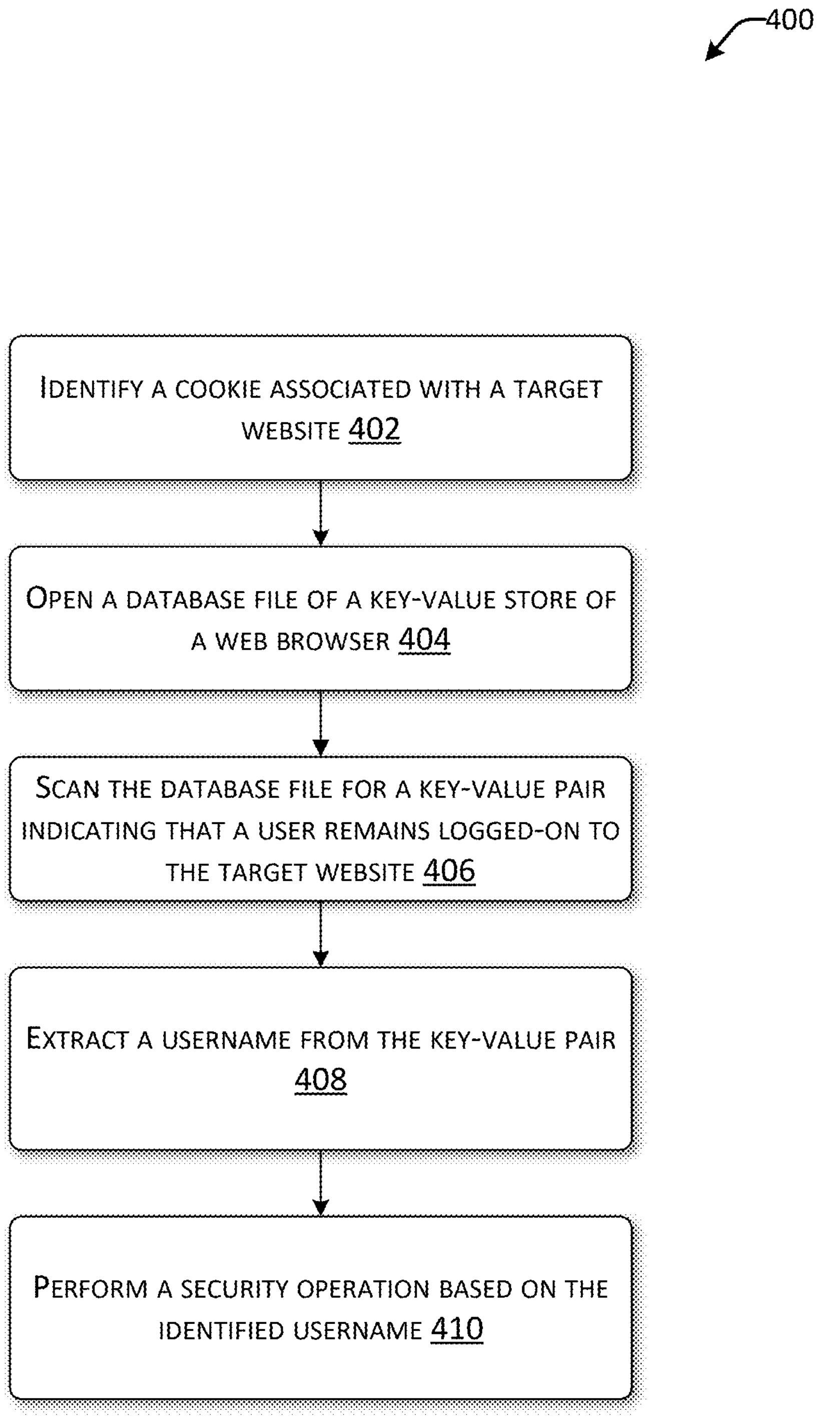
FIG. 4 is a flow diagram of an example method for detection of logged-on users based on browser storage data.

FIG. 4 is a flow diagram of an example method for detection of logged-on users based on browser storage data. Routine 400 begins at operation 402, cookie 116 associated with target website 110 is identified.

Routine 400 continues at operation 404, database file 216 of key-value storage 206 of web browser 105 is opened.

Routine 400 continues at operation 406, database file 216 is scanned for a key-value pair 218A that indicates that user 118 remains logged-on to target website 110. In some configurations, database file 216 is scanned while tab 150 is closed. In some configurations, database file 216 is scanned while browser 105 is closed. Scanning database file 216 while browser 105 is closed illustrates how determining whether user 118 remains logged-on to target website 110 is performed without utilizing built-in browser operations such as built-in APIs for accessing Local Storage or Session Storage.

Routine 400 continues at operation 408, user ID 242 is extracted from the identified key-value pair 218A.

Routine 400 continues at operation 410, where security operation 250 is performed based on having identified user ID 242 of logged-on user 118.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 400 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routines 400 may be also implemented in many other ways. For example, the routine 400 may be implemented, at least in part, by a processor of another remote computer or a local circuit. In addition, one or more of the operations of the routine 400 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 5:
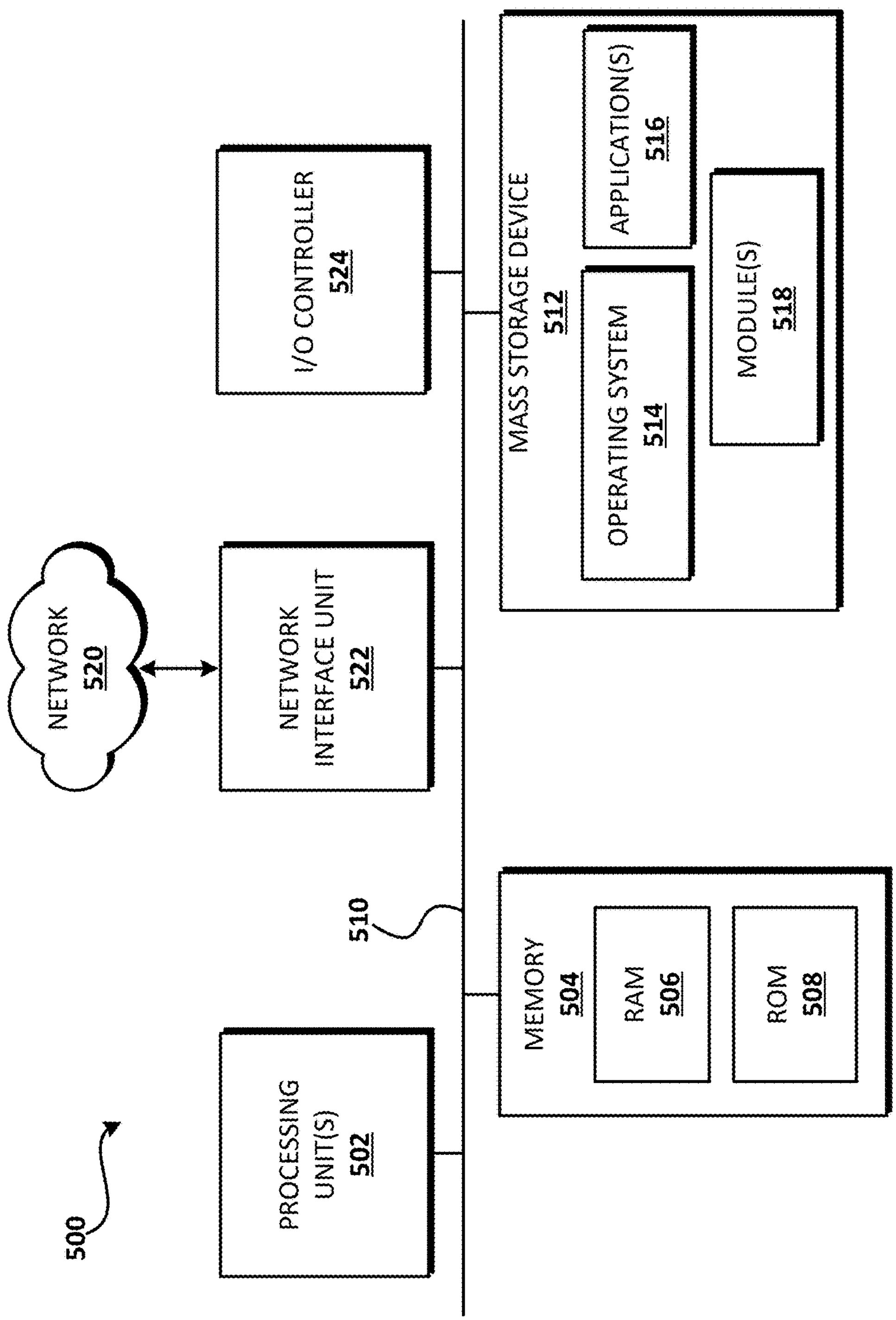
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a device, such as a computer or a server configured as part of the systems described herein, capable of executing computer instructions (e.g., a module or a program component described herein). The computer architecture 500 illustrated in FIG. 5 includes processing unit(s) 502, a system memory 504, including a random-access memory 506 ("RAM") and a read-only memory ("ROM") 508, and a system bus 510 that couples the memory 504 to the processing unit(s) 502.

Processing unit(s), such as processing unit(s) 502, can represent, for example, a CPU-type processing unit, a GPU-type processing unit, a neural processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), Neural Processing Unites (NPUs) etc.

A basic input/output system containing the basic routines that help to transfer information between elements within the computer architecture 500, such as during startup, is stored in the ROM 508. The computer architecture 500 further includes a mass storage device 512 for storing an operating system 514, application(s) 516, modules 518, and other data described herein.

The mass storage device 512 is connected to processing unit(s) 502 through a mass storage controller connected to the bus 510. The mass storage device 512 and its associated computer-readable media provide non-volatile storage for the computer architecture 500. Although the description of computer-readable media contained herein refers to a mass storage device, it should be appreciated by those skilled in the art that computer-readable media can be any available computer-readable storage media or communication media that can be accessed by the computer architecture 500.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 500 may operate in a networked environment using logical connections to remote computers through the network 520. The computer architecture 500 may connect to the network 520 through a network interface unit 522 connected to the bus 510. The computer architecture 500 also may include an input/output controller 524 for receiving and processing input from a number of other devices, including a keyboard, mouse, touch, or electronic stylus or pen. Similarly, the input/output controller 524 may provide output to a display screen, a printer, or other type of output device.

It should be appreciated that the software components described herein may, when loaded into the processing unit(s) 502 and executed, transform the processing unit(s) 502 and the overall computer architecture 500 from a general-purpose computing system into a special-purpose computing system customized to facilitate the functionality presented herein. The processing unit(s) 502 may be constructed from any number of transistors or other discrete circuit elements, which may individually or collectively assume any number of states. More specifically, the processing unit(s) 502 may operate as a finite-state machine, in response to executable instructions contained within the software modules disclosed herein. These computer-executable instructions may transform the processing unit(s) 502 by specifying how the processing unit(s) 502 transition between states, thereby transforming the transistors or other discrete hardware elements constituting the processing unit (s) 502.

The present disclosure is supplemented by the following example clauses:

Example 1: A method comprising: opening a database file that backs a key-value store for a web browser; scanning the database file for a key-value pair that indicates that a user remains logged-on to a website; extracting a user ID from the key-value pair; and generating a security operation indicating that the user remains logged-on to the website.

Example 2: The method of Example 1, wherein the database file is scanned for the key-value pair in response to a determination that the web browser maintains a cookie for the website.

Example 3: The method of Example 1, wherein the database file is opened and scanned while the web browser is closed.

Example 4: The method of Example 1, wherein the key-value pair indicates that the user remains logged-on to the website based on a determination that a key of the key-value pair includes a predefined string pattern.

Example 5: The method of Example 1, wherein the key-value pair indicates that the user remains logged-on to the website by including the user ID in a key of the key-value pair.

Example 6: The method of Example 1, wherein the key-value pair indicates that the user remains logged-on to the website by including a predefined string pattern in a key of the key-value pair.

Example 7: The method of Example 6, wherein the user ID is extracted from a value of the key-value pair.

Example 8: A system comprising: a processing unit; and a computer-readable storage medium having computer-executable instructions stored thereupon, which, when executed by the processing unit, cause the processing unit to: identify a cookie associated with a target website; open a database file that backs a key-value store for a web browser;

scan the database file for a key-value pair that indicates that a user remains logged-on to the target website; extract a user ID from the key-value pair; and generate a security operation indicating that the user remains logged-on to the target website.

Example 9: The system of Example 8, wherein key-value store is implemented with a log-structured merge-tree.

Example 10: The system of Example 8, wherein the database file is opened and scanned periodically.

Example 11: The system of Example 8, wherein the database file is opened and scanned in response to receiving an indication of a security threat.

Example 12: The system of Example 8, wherein the database file is opened and scanned in response to a determination that the user has been idle for at least a defined period of time.

Example 13: The system of Example 8, wherein the database is scanned in part by enumerating keys of key-value pairs associated with the target website.

Example 14: The system of Example 8, wherein the security operation includes an attack path that includes use of the cookie associated with the target website.

Example 15: A computer-readable storage medium having encoded thereon computer-readable instructions that when executed by a processing unit causes a system to: identify a cookie that stores a login credential for a target website; open a database file that backs a key-value store for a web browser, wherein the database file includes key-value pairs associated with multiple domains; scan the database file to identify a key-value pair indicating that the login credentials stored in the cookie are usable to gain access to the target website; extract a user ID from the key-value pair; and perform a security operation based on the identified user ID.

Example 16: The computer-readable storage medium of Example 15, wherein the security operation logs out the user from the target website.

Example 17: The computer-readable storage medium of Example 15, wherein the computer-readable instructions further cause the system to: extract a tenant identifier from the key-value pair.

Example 18: The computer-readable storage medium of Example 15, wherein the user ID is extracted from a data exchange format stored in a value of the key-value pair.

Example 19: The computer-readable storage medium of Example 15, wherein the target website comprises an authentication service.

Example 20: The computer-readable storage medium of Example 15, wherein the database file does not contain cookies.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:

opening a database file that backs a key-value store for a web browser without invoking a browser storage API;

scanning the database file for a key-value pair that indicates that a user remains logged-on to a website;

extracting a user ID from the key-value pair; and generating a security operation indicating that the user remains logged-on to the website.

2. The method of claim 1, wherein the database file is scanned for the key-value pair in response to a determination that the web browser maintains a cookie for the website.

3. The method of claim 1, wherein the database file is opened and scanned while the web browser is closed.

4. The method of claim 1, wherein the key-value pair indicates that the user remains logged-on to the website based on a determination that a key of the key-value pair includes a predefined string pattern.

5. The method of claim 1, wherein the key-value pair indicates that the user remains logged-on to the website by including the user ID in a key of the key-value pair.

6. The method of claim 1, wherein the key-value pair indicates that the user remains logged-on to the website by including a predefined string pattern in a key of the key-value pair.

7. The method of claim 6, wherein the user ID is extracted from a value of the key-value pair.

8. A system comprising:

a processing unit; and a computer-readable storage medium having computer-executable instructions stored thereupon, which, when executed by the processing unit, cause the processing unit to:

identify a cookie associated with a target website;

open a database file that backs a key-value store for a web browser without invoking a browser storage API;

scan the database file for a key-value pair that indicates that a user remains logged-on to the target website;

extract a user ID from the key-value pair; and generate a security operation indicating that the user remains logged-on to the target website.

9. The system of claim 8, wherein key-value store is implemented with a log-structured merge-tree.

10. The system of claim 8, wherein the database file is opened and scanned periodically.

11. The system of claim 8, wherein the database file is opened and scanned in response to receiving an indication of a security threat.

12. The system of claim 8, wherein the database file is opened and scanned in response to a determination that the user has been idle for at least a defined period of time.

13. The system of claim 8, wherein the database is scanned in part by enumerating keys of key-value pairs associated with the target website.

14. The system of claim 8, wherein the security operation includes an attack path that includes use of the cookie associated with the target website.

15. A computer-readable storage medium having encoded thereon computer-readable instructions that when executed by a processing unit causes a system to:

identify a cookie that stores a login credential for a target website;

open a database file that backs a key-value store for a web browser without invoking a browser storage API, wherein the database file includes key-value pairs associated with multiple domains;

scan the database file to identify a key-value pair indicating that the login credentials stored in the cookie are usable to gain access to the target website;

extract a user ID from the key-value pair; and perform a security operation based on the identified user ID.

16. The computer-readable storage medium of claim 15, wherein the security operation logs out the user from the target website.

17. The computer-readable storage medium of claim 15, wherein the computer-readable instructions further cause the system to:

extract a tenant identifier from the key-value pair.

18. The computer-readable storage medium of claim 15, wherein the user ID is extracted from a data exchange format stored in a value of the key-value pair.

19. The computer-readable storage medium of claim 15, wherein the target website comprises an authentication service.

20. The computer-readable storage medium of claim 15, wherein the database file does not contain cookies.

* * * * *